April 2, 1946.    K. DAVIS    2,397,538
DRIVE COUPLING
Filed Aug. 10, 1944    2 Sheets-Sheet 2
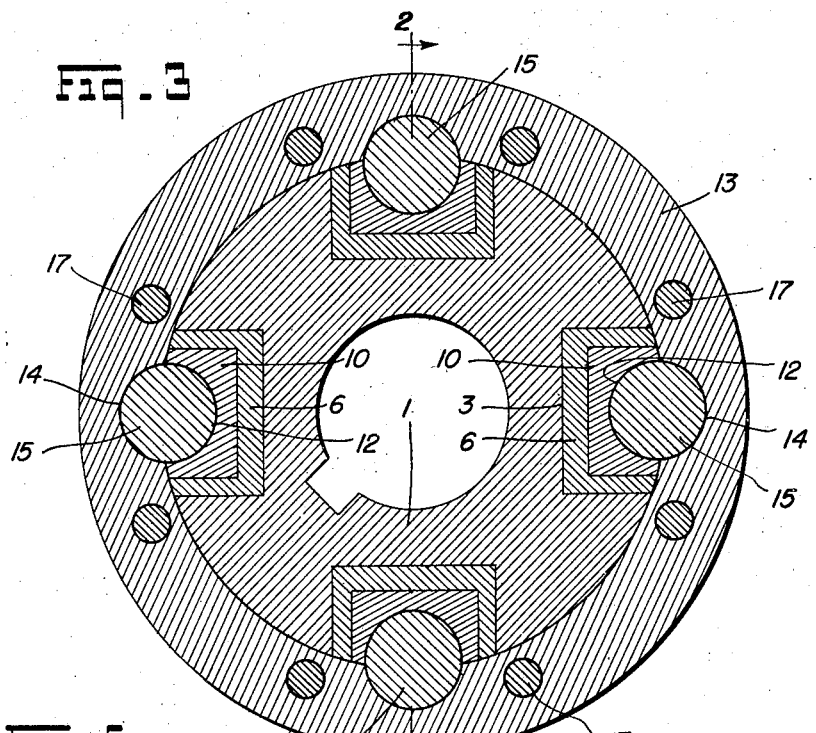
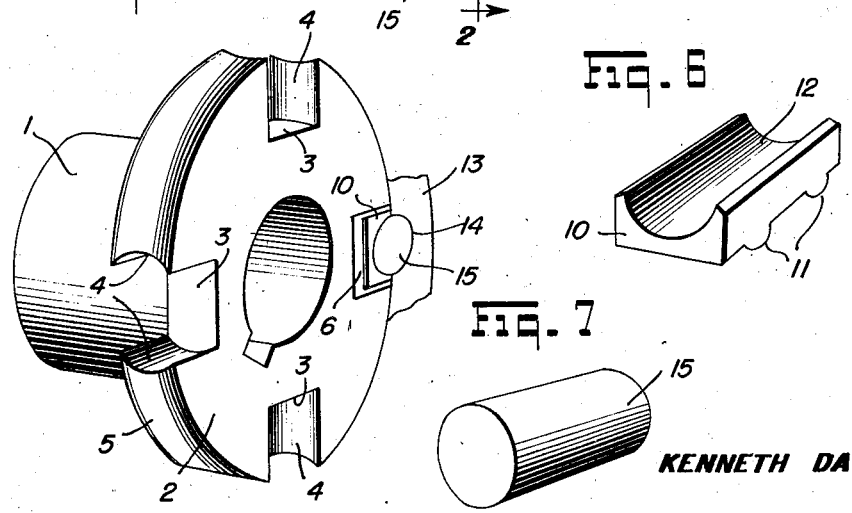
Inventor
KENNETH DAVIS
By *Clarence A. O'Brien
and Harvey B. Jacobson*
Attorneys Patented Apr. 2, 1946

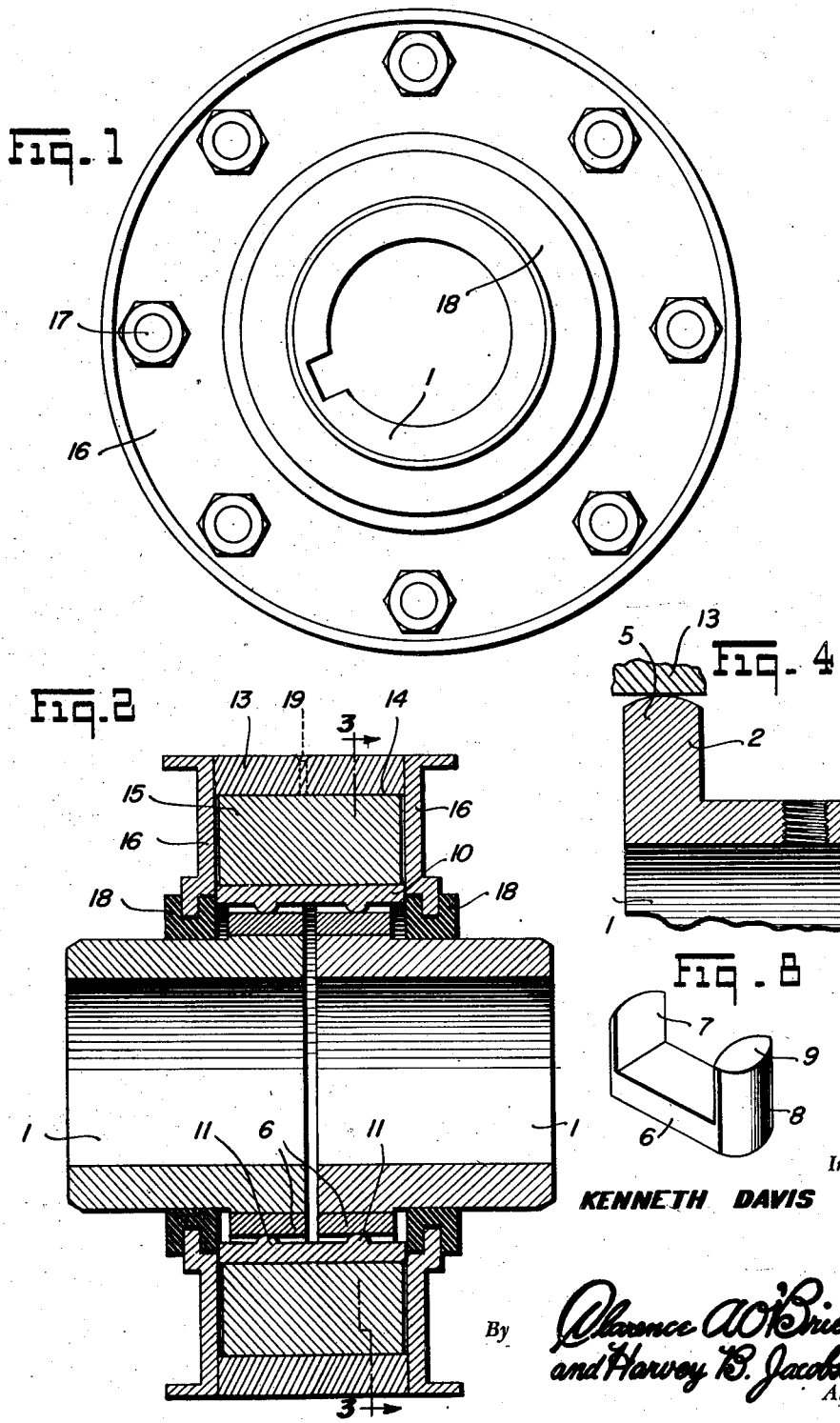

2,397,538

UNITED STATES PATENT OFFICE 2,397,538

DRIVE COUPLING

Kenneth Davis, Ontario, Calif.

Application August 10, 1944, Serial No. 548,899

4 Claims. (Cl. 64—6)

The present invention relates to new and useful improvements in drive couplings, and has for its primary object to provide, in a manner as hereinafter set forth, a unit of this character comprising a unique construction and arrangement whereby both angular and longitudinal misalignment will be permitted to occur but wherein the area of driving contact will remain substantially the same at all times.

Other objects of the invention are to provide a drive coupling of the aforementioned character which will be comparatively simple in construction, strong, durable, reliable, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Fig. 1 is a view in end elevation of a drive coupling constructed in accordance with the present invention.

Figure 2 is a view in longitudinal section through the device, taken substantially on the line 2—2 of Figure 3.

Figure 3 is a transverse sectional view, taken substantially on the line 3—3 of Figure 2.

Figure 4 is a fragmentary view in section through a portion of one of the hubs or sleeves.

Figure 5 is a perspective view of one of the hubs or sleeves.

Figure 6 is a detail view in perspective of one of the key supporting blocks.

Figure 7 is a detail view in perspective of one of the cylindrical keys.

Figure 8 is a detail view in perspective of one of the elements in which the key blocks are mounted.

Referring now to the drawings in detail, it will be seen that the embodiment of the invention which has been illustrated comprises a pair of metallic hubs or sleeves 1 to be keyed on the shafts to be connected. As best seen in Figure 2 of the drawings, the inner ends of the sleeves 1 are spaced from each other. Formed integrally with the inner end portions of the sleeves 1 are apertured flanges 2. The flanges 2 have formed therein peripheral seats or recesses 3. The end walls 4 of the seats 3 are substantially concave in transverse section. The flanges 2 further include rounded peripheries 5.

Substantially U-shaped bearings 6 are mounted for slight oscillation in the seats 3. The end portions 7 of the bearings 6 comprise substantially rounded outer faces 8 which are journaled in the correspondingly shaped ends 4 of the seats 3. The portions 7 of the bearings 6 further include beveled upper ends 9.

The bearings 6 on the flanges 2 are in substantially longitudinal alignment. The adjacent bearings 6 receive the end portions of elongated, longitudinal blocks 10. Formed transversely beneath the blocks 10 are integral ribs 11 of substantially semi-circular transverse section constituting fulcrums which rest in the bearings 6. This is shown to advantage in Figure 2 of the drawings. The blocks 10 have formed longitudinally in their upper portions substantially semi-circular ways 12.

Encircling the assembly as thus far described is a one-piece ring 13 of suitable metal. The ring 13 has formed in its inner periphery substantially semi-circular ways 14 which complement the ways 12. The opposed ways 12 and 14 have mounted therein cylindrical keys 15. Annular plates 16 are mounted on the ends of the ring 13. The members 13 and 16 are apertured to accommodate securing bolts 17. Oil seals 18 are provided in the end plates 16. The ring 13 has formed therein an oil duct 19.

It is thought that the operation of the unit will be readily apparent from a consideration of the foregoing. Briefly, the bearings 6 oscillate slightly in the seats 3 and the blocks 10 rock slightly on the fulcrums 11 in said bearings 6 to permit sufficient angular and longitudinal disalignment of the sleeves 1 to occur. However, the construction and arrangement is such that the area of driving contact remains substantially constant at all times. The ends of the cylindrical keys 15 are spaced sufficiently from the end plates 16 to prevent binding and permit flexibility. The clearance between the inner periphery of the ring 13 and the rounded peripheral edges of the flanges 2 allows a rolling movement of said flanges in the assembly.

It is believed that the many advantages of a drive coupling constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:

1. A drive coupling of the character described comprising a pair of opposed sleeves, flanges on the inner ends of said sleeves having seats therein, bearings mounted for oscillation in the seats, blocks extending between the adjacent bearings and rockable therein, a ring encircling the flanges, and keys connecting the ring and the flanges.

2. A drive coupling of the character described comprising a pair of substantially aligned sleeves, flanges on the inner end portions of said sleeves, said flanges having peripheral seats therein, substantially U-shaped bearings mounted for oscillation in the seats, elongated blocks extending between the adjacent bearings and including fulcrums engaged in said bearings, a ring encircling the flanges, said ring and the blocks having opposed ways therein, and keys engaged in the opposed ways for connecting the ring to the flanges.

3. A drive coupling of the character described comprising a pair of substantially aligned sleeves, flanges on the inner ends of said sleeves, said flanges having peripheral seats therein, said seats including end walls of substantially concave transverse sections, substantially U-shaped bearings mounted for oscillation in the seats, said bearings comprising end portions including substantially rounded outer faces engaged in the end walls of the seats, elongated blocks extending between the adjacent bearings, said blocks including transverse trunnions resting on the bearings, said blocks having substantially semi-circular longitudinal ways therein, a ring encircling the flanges, said ring having substantially semi-circular longitudinal ways in its inner periphery opposed to the first-named ways, cylindrical keys mounted in the opposed ways, annular plates mounted on the ends of the ring, and oil sealing members between said plates and the sleeves.

4. A drive coupling of the character described comprising a pair of spaced, substantially aligned sleeves, opposed flanges on the inner end portions of said sleeves, said flanges having aligned peripheral seats therein, substantially U-shaped bearings mounted for oscillation in the seats, elongated blocks rockable in the aligned bearings, a ring encircling the flanges, said ring and the blocks having opposed ways therein, keys mounted in the opposed ways for connecting the ring to the flanges, and annular plates on the ends of the ring.

KENNETH DAVIS.